United States Patent [19]

Stutz

[11] Patent Number: 4,482,222

[45] Date of Patent: Nov. 13, 1984

[54] FILM VIEWER AND ANALYZER AND METHOD

[76] Inventor: William H. Stutz, 3446 Wonderview Dr., Los Angeles, Calif. 90068

[21] Appl. No.: 442,363

[22] Filed: Nov. 17, 1982

[51] Int. Cl.³ .................... G03B 19/18; G03B 21/32
[52] U.S. Cl. ...................................... 352/39; 356/396
[58] Field of Search ...................... 352/39; 353/30; 356/378, 383, 384, 391, 396, 397

[56] References Cited

U.S. PATENT DOCUMENTS

| | | | |
|---|---|---|---|
| 3,031,923 | 5/1962 | Heidenhain | 356/397 |
| 3,131,483 | 5/1964 | Koenig | 356/397 |
| 3,369,444 | 2/1968 | Patrignani | 356/396 |
| 3,985,448 | 10/1976 | Wiklund et al. | 356/396 |

Primary Examiner—Monroe H. Hayes
Attorney, Agent, or Firm—Marvin H. Kleinberg

[57] ABSTRACT

An image viewing device is provided with movable projectors which superimpose illuminated marks on the image. Each projector can signal its location relative to a rest position and, by aligning the illuminated marks with selected features on the image, the distance between the features can be determined and displayed. Signal storage means permit comparisons between successive measurements. The viewing device can translate and rotate the viewed image so that the selected features can be aligned with the travel direction of the movable projectors.

16 Claims, 7 Drawing Figures

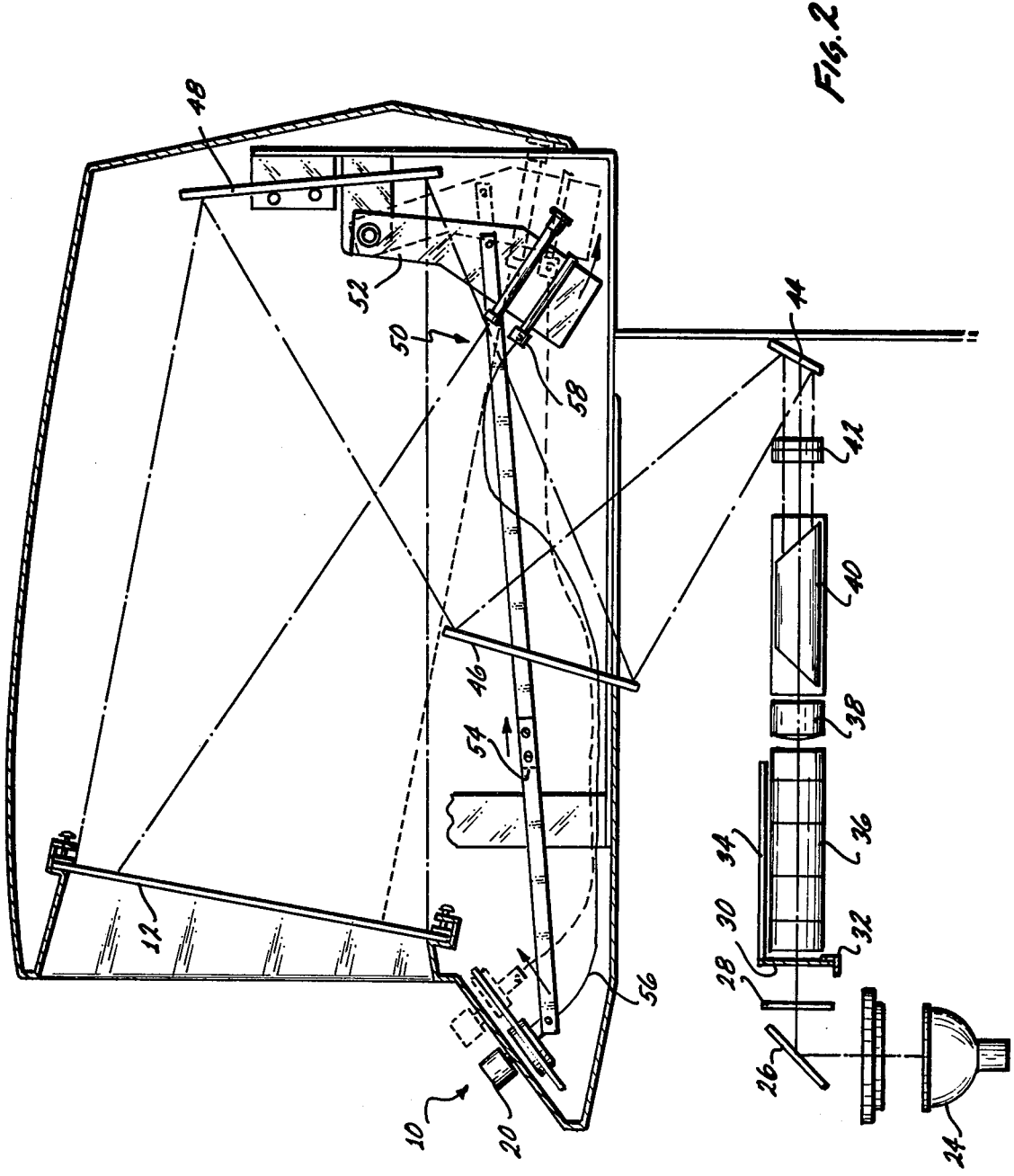

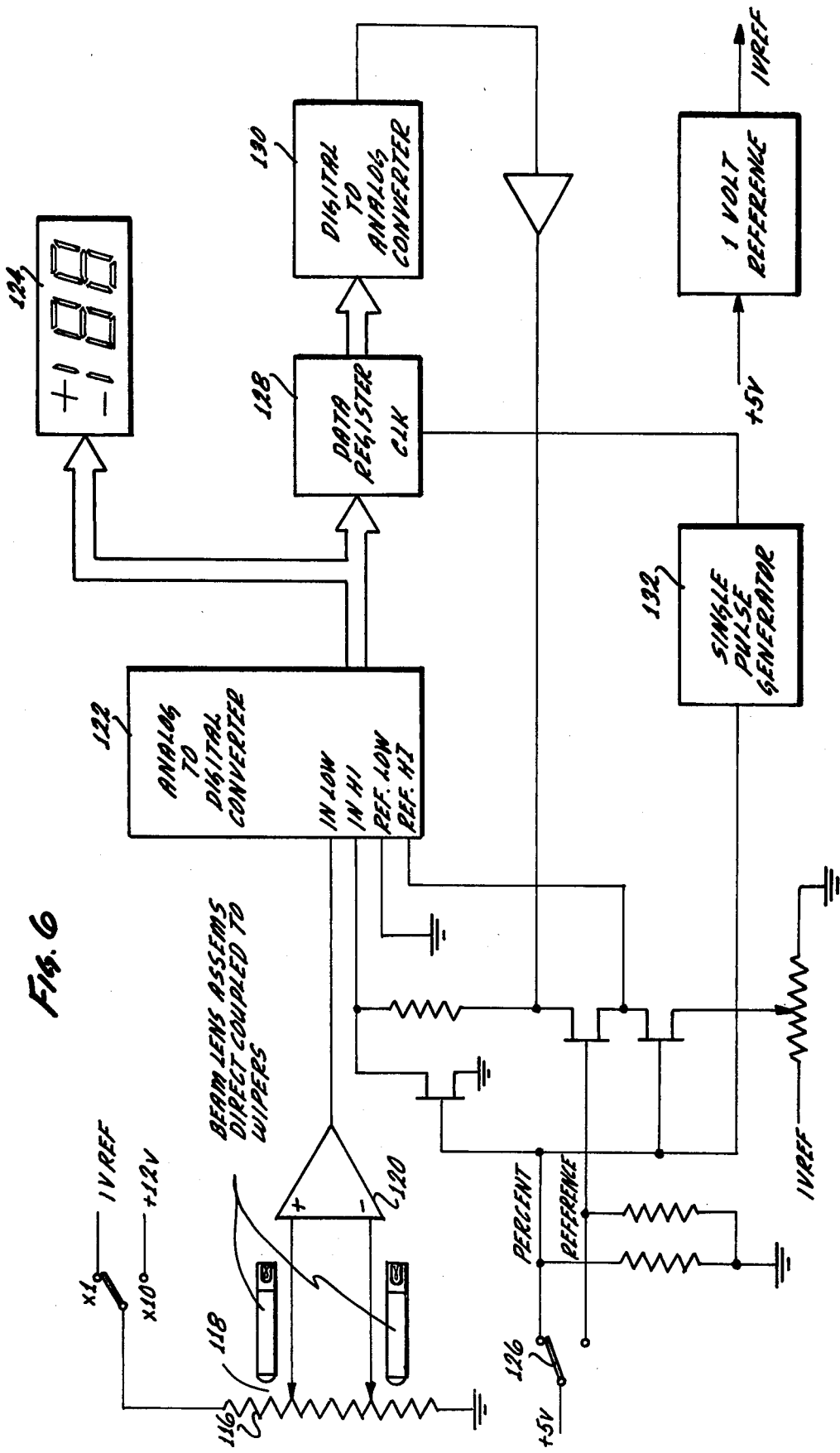

FILM VIEWER AND ANALYZER AND METHOD

The present invention relates to film viewers and more particularly to a viewer which provides superimposed index marks or "pointers" on the projected image, which pointers are generated in a movable projector whose relative position can be signalled.

Prior art viewers of photographic film, in the past, have generally required that the observer who wishes to measure distances between predetermined points on the displayed image, physically measure the distance, using a straight edge, compass/divider or the like. The measurement can then be utilized in subsequent activities. If the measurement is to be used in a computational process, then it must be "entered" into a data processing system.

In recent years, medical diagnosis techniques have employed motion picture radiography in many areas to monitor the progress of a catheter or bolus through the body. In addition, cardiac specialists use angiograms which utilize motion pictures to diagnose cardiovascular problems. Orthopedic surgeons preparing for surgery must use x-ray photographs to ascertain dimensions for prosthetic devices, pins, plates and the like to assure proper fit.

What is needed and what has been provided in the present invention is a film viewer that includes a pair of individually movable projected index "marks" or "pointers". An electrical signal is generated corresponding to the relative location of each "mark" and a signal representing the distance between the two can also be provided. The signals are easily converted to a digital display and are available as inputs for either analog or digital computation.

Simple electronic techniques permit storage of "start" or "reference" locations. The distance between the "start" location and an "unknown" location can be easily measured. The pointer projectors are movable on a carriage that taps potentiometer resistance elements so that each location of the projector results in a characteristic voltage signal.

The projectors superimpose an illuminated mark of predetermined shape on the projected film image. By manipulating the projected marks, any particular feature of the image can be measured. Means are provided so that the film image can be translated or rotated. This simplifies the structure of the mark projectors which then need only translation of the projectors to measure virtually any feature of the film image.

While the preferred embodiment of the invention is mechanized in a motion picture film viewer that includes a film transport mechanism, the invention could just as easily be used in conjunction with any film projection system or with an opaque projector system as well. In the preferred embodiment, the projectors are aligned to move in parallel and share a common potentiometer element. The marks can be shifted on the projected images until an unknown distance is spanned. The system can then display, on a digital read out, the magnitude of that distance in pre-selected units of measurement. Alternatively, the display may present some numerical function of previous measurements In the angiogram viewer embodiment, the constriction of a vascular passage may be compared with a normal passage. The constriction can be expressed as a percentage of the normal passage. This is accomplished by translating and, if necessary, rotating the image until it is aligned with the projected, sumperimposed index marks. The marks are then moved until they demark the boundaries of, for example, a normal artery. The measurement is stored and the image is shifted so that a constriction or restriction in the same artery can be measured. After computation, the digital display reads out a percentage that expresses the degree to which the artery has been blocked.

In alternative embodiments, only one superimposed index mark is movable, or both may be translatable along orthogonal axes, thereby obviating the need to move the projected film image.

The novel features which are characteristic of the invention, both as to structure and method of operation thereof, together with further objects and advantages thereof, will be understood from the following description, considered in connection with the accompanying drawings in which several preferred embodiments of the invention are illustrated by way of example. It is to be expressly understood, however, that the drawings are for the purpose of illustration and description only, and are not intended as a definition of the limits of the invention.

FIG. 2 is a side sectional view of the viewing device of FIG. 1 showning the optical path of the image;

Figure 5:
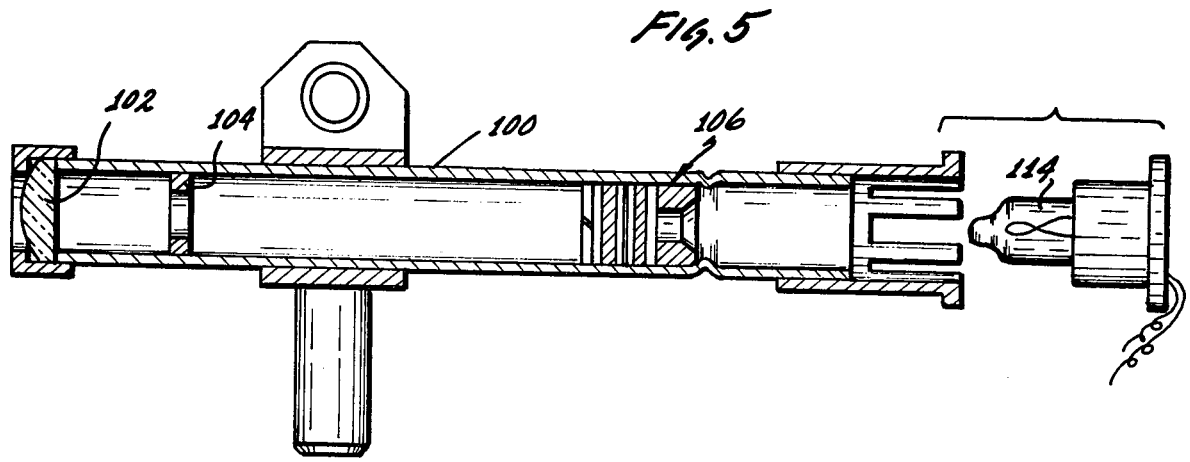
Figure 5A:
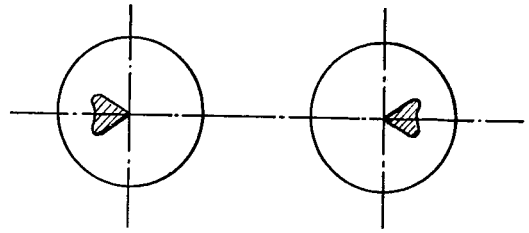

FIG. 5 including FIG. 5a is a detailed diagram showing the construction of a projecter for one of the indicia and the projected index mark; and FIG. 6 is a block diagram of the circuits which provide a readout based upon the positioning of the illuminated indicia.

Figure 1:
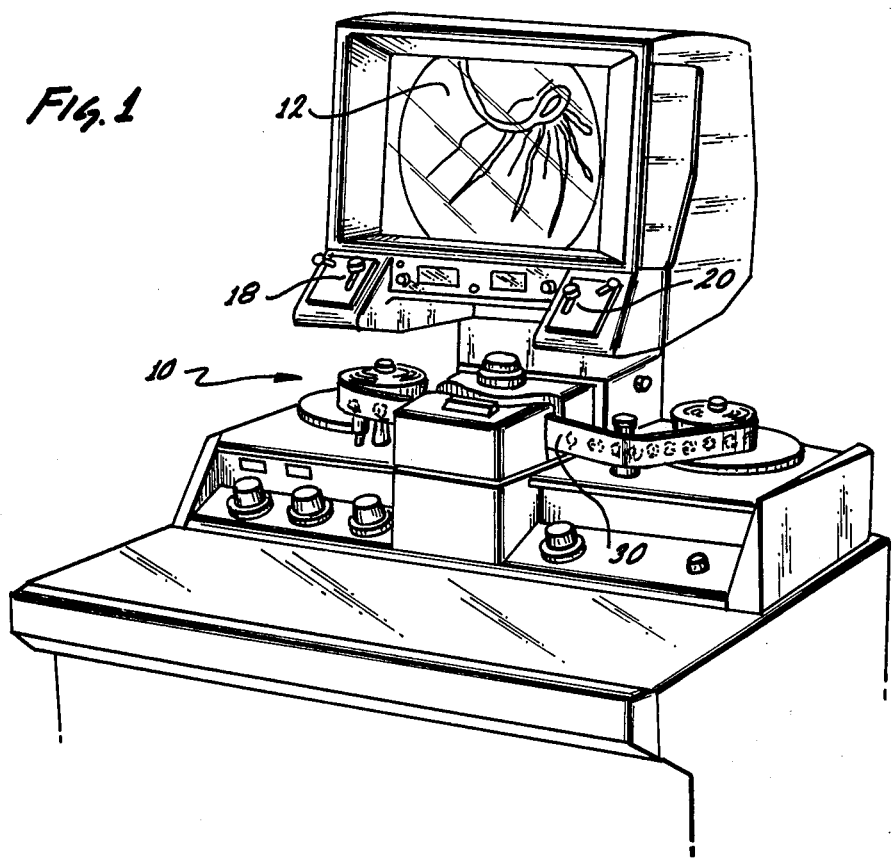
FIG. 1 is a perspective view of a viewing device in which illuminated indicia are superimposed upon an image.

Turning first to FIG. 1, there is shown a film viewer which can be based, to a great extent, upon the structure shown in my previously issued U.S. Pat. No. 3,912,383, of Oct. 14, 1975. The device has been modified in accordance with the teachings of the present invention to provide user accessible controls which can both translate and rotate the displayed image and which can direct the location of the superimposed illuminated indicias or "pointers".

As seen in FIG. 1, the viewer device is provided with a screen 12 which, in a preferred embodiment, has a ground glass surface presented to the viewer. It has been determined that this embodiment, while retaining the normal advantages of such a viewing screen, has the added benefit of presenting a substantially non-reflective surface to the viewer, making the device more useful in the presence of light sources which would otherwise glare off of a plane surface. A pair of numerical display 14, 16 are used to present information with respect to the frame being viewed, and a desired relationship between a first measurement with the illuminated pointers and a second measurement with the pointers.

As illustrated, the device is used as an angiogram viewer and analyzer. Angiograms, on 35 millimeter motion picture film, can be examined either continuously or frame by frame. In the preferred embodiment, the illuminated pointers are used to measure the width of a normal blood vessel and the width of a constriction in the same vessel and these values can be displayed. In the preferred embodiment, a calculation is performed and the displayed result indicates the percentage of constriction or stenosis. Other functions can be displayed, given the basic measuring capability.

A left hand control knob 18 both translates in the vertical direction and rotates. The translation shifts the displayed image in the vertical direction while rotation moves the left hand pointer to the right or left. Similarly, a right hand control 20, in translation, moves both of the pointer beams in the vertical direction, while in rotation moves the right hand beam in the horizontal direction. An image control lever 22 causes the displayed image to be shifted in the horizontal direction. The image control lever 22 and its operative components and their functions are better illustrated in connection with FIG. 3 described below.

Other controls on the console are available to start and stop the film, focus the image and rotate the image through the use of a dove prism as shown in connection with FIG. 2, below In operation, a selected frame is displayed on screen 12. The frame can be identified through a frame number established by a counter that may count sprocket holes on the film or rotation of the viewing prism. Techniques to count frames are well known and need not be discussed.

When the desired frame is displayed, a particular feature to be measured is selected. Since, in the preferred embodiment, the pointers move in the horizontal direction, the various control knobs are manipulated to align the feature in such a way that horizontal movement of the pointers will give the desired measurement.

The feature is then measured by aligning one pointer at one edge of the feature and the second pointer at the second edge of the feature. The distance separating the pointers is then noted and stored.

Where the feature of interest is a relatively normal section of an artery and an occluded portion of the same artery, the image is shifted to coincide with the pointers through rotation and/or translation of the image, and/or vertical translation of both pointers. The constriction is then measured and that measurement can be stored.

After computation, a readout is displayed, representing, in this embodiment, the percentage of stenosis, or the difference in the measurement of the unobstructed and obstructed arteries divided by the measurement of the unobstructed artery. This can be expressed $d_1-d_2/d_1$ where $d_1$=measurement of the "normal" vessel, and $d_2$=measurement of the constricted vessel.

Turning next to FIG. 2, there is shown in side sectional, diagrammatic view, the optical and mechanical elements of the viewer 10. The optical path starts with a light source 24 which is reflected by a mirror 26 through a condenser lens 28 onto the film 30. The film 30 is supported in a frame 32 and is engaged by a sprocket wheel 34 which is integral with a multisided prism 36.

As explained in the Stutz patent, supra, the rotation of the sprocket-prism combination avoids the need for conventional, intermittent film drives. A projector lens 38 passes the film image through a dove prism 40, which is capable of rotating the projected image about the optical axis.

An adjustable enlarging lens 42 directs the image to a first projection mirror 44. A second projection mirror 46 is mounted for rotation about both a vertical axis and a horizontal axis, enabling the projected image to be shifted on the screen. The image is then directed to a third projection mirror 48, which directs the image to the screen 12.

The pointer projection system 50 is mounted on a lever assembly 52 which moves both projected pointer images vertically on the screen as the assembly is moved about a pivot point. A pointer linkage assembly 54 is coupled to the right hand control knob 20 which, when translated, moves the lever assembly back and forth about the pivot point, to the change the location of the projected pointer images.

The right hand control knob 20 is connected, through a flexible cable or tach shaft to a traverse mechanism 58 on the pointer projection system 50.

A similar control cable, better seen in connection with FIG. 3, below, couples the left hand control knob 18 to the pointer projection system 50 to control the left hand pointer image.

The enlarging lens 42 is provided to permit measurement of some details that would otherwise be too small on the screen. The use of the enlarging lens can increase the size of the image and the various controls can relocate the placement on the screen of a desired feature. A scale-change is available so that measurements can be made with the greater precision afforded by the enlarged image.

Figure 3:
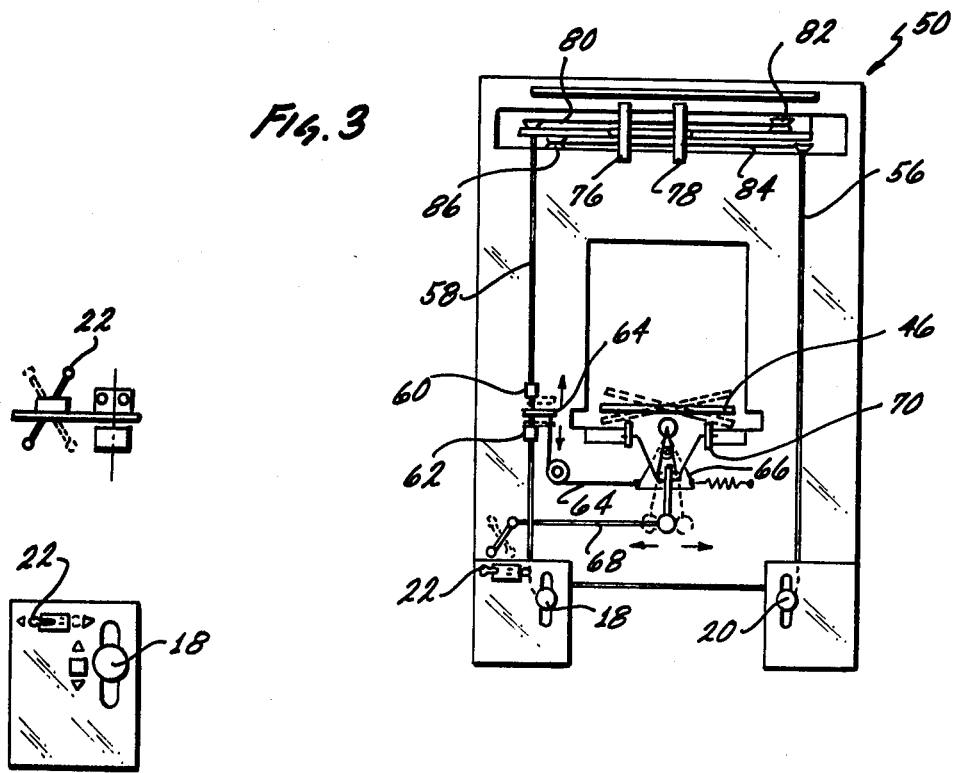
FIG. 3 is a diagrammatic view of the elements used in shifting the image and the indicia.

Turning next to FIG. 3, the various control elements are shown in idealized, diagrammatic form. As seen, a flexible cable or tach shaft 58 is connected to the left hand knob 18. A pair of stops 60, 62 support the cable and a mirror control cable 64, which is connected to rotate a cam 66, is coupled to the tach shaft and is constrained to move between the stops.

Moving the knob 18 to and fro in the console moves the flexible tach shaft 58 and the mirror control cable 64 attached thereto. By rotating the cam 66 about a pivot point, the second projection mirror 46 is rotated about a horizontal axis, thereby shifting the image in the vertical direction, as viewed on the screen.

The image control lever 22 is connected, through a linkage 68, to rotate, through a second cam 70, the second projection mirror 46 about a vertical axis, thereby shifting the image on the screen in the horizontal direction.

The pointer projection system 50 is shown, in FIG. 3, to include a pair of pointer projectors 70, 78 for the left and right superimposed illuminated pointers, respectively. The left beam tach shaft cable assembly 58 drives a left hand friction cable drive assembly which includes a pulley 82 around which the drive line is looped. Both ends of the drive line are coupled to the left hand pointer projector 76 with a spring coupling.

As the knob 18 rotates, the tach shaft 58 drives one end of the friction cable assembly 80, pulling the projector 76 in the direction of rotation. Clockwise rotation of the knob 18 will result in left-to-right movement of the projecter 76 and vice versa.

Similary, the right hand tach shaft 56 is coupled to a right hand friction cable assembly 84, which includes a cable pulley 86 to move the right hand pointer projector 78 back and forth in the horizontal direction.

Figure 4:
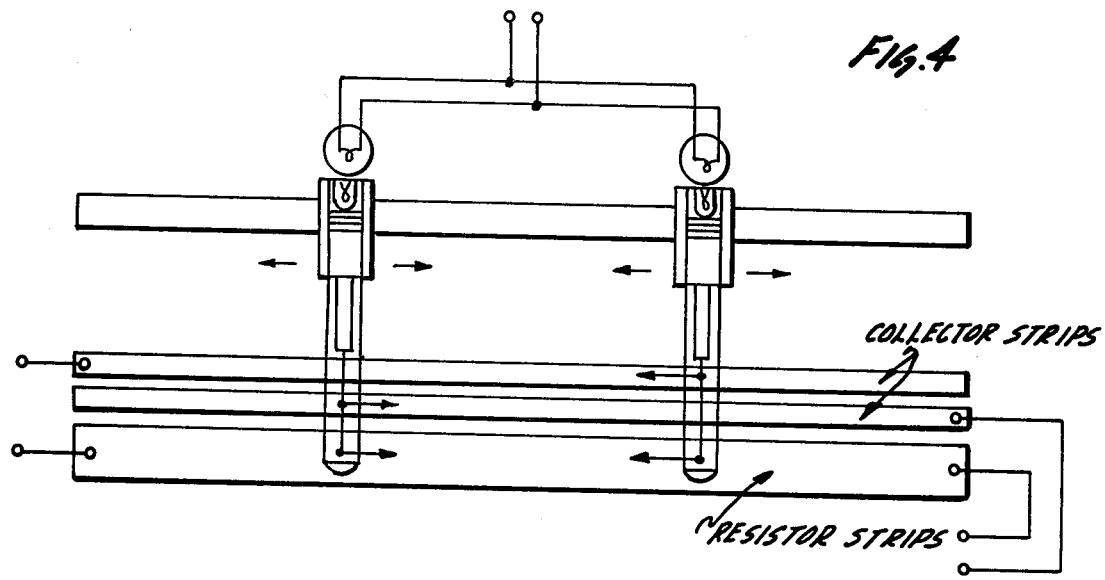
FIG. 4 is an idealized view of the projecters utilized in creating illuminated indicia.

FIG. 4 illustrates, in somewhat greater detail, a preferred embodiment of the pointer projectors 76, 78, and their associated resistive strips that form a potentiometer circuit. As shown in FIG. 4, in idealized diagrammatic fashion, a resistive strip is provided with a first track 90 and a second track 92. A third, common strip has essentially no impedance.

The first and second resistive tracks 90, 92 are manufactured to have substantially the same linear impedance from end to end and are matched, so that when a potential is applied to the strip, a sliding contact that couples the strip to the common track 94, will provide a voltage output that is directly proportional to the distance from the end of the strip to which the potential is applied.

One of the pointer projecters includes sliding contacts or wipers between the first resistive track and the common track, and the other pointer projector carries sliding contacts or connecting the second resistive track 92 to the common track 94.

The contacts are adjusted so that with the pointer projectors adjacent each other, both signal the same potential, no matter where their location on their respective, resistive tracks. The pointer projectors are aimed so that when the projectors are adjacent, the projected pointer images are also abutting.

When one of the pointer projectors is positioned by locating the projected pointer at a predetermined part of the projected image, the position of the pointer projector can be represented by a voltage derived from the position of its contact on the respective resistive track. As the other pointer projector is moved so that its projected pointer image is superimposed upon a different element of the projected image, a different voltage will signal the location of the second pointer projector. Suitable circuits can subtract these voltages to provide a voltage signal, representative of the distance between the pointers on the screen.

Turning to FIG. 5, there is a partially exploded side diagram of one embodiment of a pointer projector, useful in the present invention. As seen in FIG. 5, the pointer projecter includes a lens barrel 100, a projection lens 102, a masking element 104, and an image assembly 106.

The image assembly 106 includes an image plate 108, which creates the preferred pointer image, in this embodiment, an arrowhead, as illustrated in FIG. 5a. A color plate 110 and a retainer plate 112 sandwich the image plate and hold it to maintain registration and a flat field.

Finally, a projection lamp 114 is fitted at the end of the lens barrel to create the projected image of the arrowhead, which is superimposed on the photographic image that is projected on the screen 12.

FIG. 6 is a idealized block diagram of the electrical circuits which, in the preferred embodiment, measure the distance between the projected pointers and generate a numerical representation of the distance between the pointers. Although each pointer is coupled to a different resistive strip, for purposes of explanation, a single resistive element 116 is shown, with each projecter being coupled to a different wiper 118.

The variable resistor 116 has a fixed voltage applied across the resistive element. The movable wiper-taps 118 provide a voltage relative to the tap positions. The two taps 118 are connected to the two inputs of an instrumentation amplifier 120 which provides an output signal proportional to the distance between the two taps 118 and projector pointers 76, 78. The instrumentation amplifier 120 is adjustable in gain and offset.

The measuring process starts by taking a reference reading. A control switch 126 is placed in the "reference" position and the pointers are moved to measure the "reference" distance. The output from the instrumentation amplifier 120 is fed to an analog to digital converter (ADC) 122. The ADC 122 has a fixed voltage applied to its reference input which represents full scale. The digital output "word" is stored in a data register 128 which is continuously updated until the control switch 126 is moved to the "percentage" position.

The percentage measurement is made by placing the control switch 126 in the percentage position and moving the pointers to measure the "unknown" distance. The output of the instrumentation amplifier 120 is again fed to the ADC 122. In this mode, the ADC is used as a ratiometric converter.

The data register 128 holding the digitized reference value is applied to the input of a digital-to-analog converter (DAC) 130. The DAC 130 output signal is fed back to the reference input of the ADC 122. The ADC 122 converts the unknown distance input as a percentage of the reference distance and the results are displayed on the digital readout 124. The percentage can range from 0% for equal distances to 100% when the unknown distance input is zero.

A single pulse generator 132 is triggered by the input voltage applied to the switch 126 in the "reference" position and supplies a clock pulse to the data register 128, which enables the provision of data to the DAC 130.

A change of scale switch is provided with alternative connections to two sources of reference potential. In a first position, one reference voltage is supplied to the potentiometer 116 while a second potential at some desired multiple of the reference voltage is supplied to change the scale of measurement. For example, if the reference voltages differed by a factor of 10, then one scale could represent centimeters while the other would represent millimeters.

Thus there has been shown a novel apparatus for measuring distances between points on a displayed image. While the preferred embodiment has been described in the environment of a motion picture film viewer, adopted to view angiograms, it will be apparent to those skilled in the art that the teachings are equally applicable to virtually any device with which an image is viewed. Such devices could include opaque projectors and slide projectors, in which the superimposed pointer images can be applied to the same viewing surface.

It is also within the scope of the invention to utilize projected pointers on a conventional film viewing box, such as is used with X-ray films. If the pointer projectors can be mounted upon a platform which can be rotated and/or translated, the negative can be held fixed and the projected pointers can be moved to any portion of the negative.

Moreover, the principles are equally useful if the film to be viewed is a series of still frames with a series of different images. If it is desired to measure the space between different points of interest on any viewed image, then the present invention can easily be adapted to that use, as well. Further, through the use of the pointers, readouts of the distance from the individual pointers to a reference point can be displayed. Alternatively, the readout of the distance between the pointers can be displayed. Further, a data processor can be employed to accept the data inputs, which can then generate any desired mathematical function of the applied input signals.

Accordingly, the scope of the invention should be limited only by the scope of the claims appended hereto.

What is claimed as new is:

1. In combination with a viewing device having a screen upon which an image can be viewed, apparatus for making measurements on the image comprising:
   (a) first projection means capable of superimposing a reference mark on the viewed image;
   (b) first carriage means coupled to said first projection means including transducer means for generating signals representative of distance traveled by said projection means from a predetermined rest location;
   (c) first means for moving said first carriage means to locate said reference mark at a desired point on the viewed image;
   (d) measuring means coupled to said transducer means for producing a signal corresponding to and representative of the location of the desired point relative to a point corresponding to the rest location of said reference mark; and
   (e) display means coupled to said measuring means for providing a visible record of the measuring means signal.

2. The apparatus of claim 1, above wherein said display means includes analog to digital converting means and a digital display coupled thereto for providing a numerical representation of the measured distance.

3. The apparatus of claim 1, above, further including:
   (a) second projection means capable of superimposing a second reference mark upon the viewed image, whereby said second reference mark corresponds to the predetermined rest location and measurements reflect the distance between said first and second reference marks.

4. The apparatus of claim 1, above, further including:
   (a) second projection means capable of superimposing a second reference mark on the viewed image;
   (b) second carriage means coupled to said second projection means including transducer means for generating second signals representative of distance traveled by said projection means from a predetermined rest location; and
   (c) second means for moving said second carriage means to locate said second reference mark at a desired point on the viewed image whereby said measuring means is further coupled to said second carriage means transducer means, so that signals representing the distance between the reference marks can be generated.

5. The apparatus of claim 1 wherein said measuring means further includes means for storing signals corresponding to the position of said carriage means for use in later computations.

6. The apparatus of claim 4, above, wherein said measuring means further includes means for storing signals representing the distance between reference marks.

7. Apparatus of claim 1 wherein said transducer means include a linear resistive element adapted to be connected to a source of reference potential and wiper means coupled to said carriage and operable with said resistive element, whereby a potential appears at said wiper means as a function of the translational distance between said carriage and the end of said resistive element to which the potential source is coupled.

8. Apparatus of claim 4 wherein said transducer means include a pair of matched, linear resistive elements adapted to be connected to a source of reference potential; a conductive strip insulated therefrom and adapted to be coupled to a source of common potential; and wipers, each movable with a different carriage and operable with said resistive elements to provide a potential indicative of the translational distance between the respective carriage and an end of said resistive elements.

9. A method for measuring distances on recorded images utilizing projected superimposed reference marks comprising the steps of:
   (a) aligning a first projected reference mark with a first point on the image;
   (b) generating a first signal corresponding to the location of the projector casting the first reference mark;
   (c) aligning a second projected reference mark with a second point on the image;
   (d) generating a second signal corresponding to the location of the projector casting the second point on the image;
   (e) comparing said first and second signals to produce a third signal representing a distance between the projected reference marks.

10. The method of claim 9, above, including the further steps of:
    Translating said first and second projected marks on the recorded image to measure predetermined features of the recorded image.

11. The method of claim 10, above, including the further step of rotating the recorded image to align a predetermined feature with the axis of motion available to the superimposed reference marks.

12. The method of claim 9, above, including the further step of magnifying the recorded image.

13. The method of claim 12, above, including the further step of changing the scale of said first and second signals to correspond to the magnified recorded image.

14. The method of claim 9, above, including the further step of displaying a digital representation of said third signal.

15. The method of claim 9, above, further including the steps of:
    (f) storing said third signals;
    (g) repeating steps (a) through (e) to measure the distance between a third and fourth point on the recorded image; and
    (h) mathematically manipulating the stored third signal and the generated third signal to produce a fourth signal representing a predetermined mathematical function of said third signal.

16. The method of claim 15, above, wherein said mathematical function is expressed as $d_1 - d_2 / d_1$ whereby $d_1$ represents the stored third signal, and $d_2$ represents the currently presented third signal.